No. 609,962. Patented Aug. 30, 1898.
J. W. DUNN.
PNEUMATIC TIRE.
(Application filed Feb. 28, 1898.)

(No Model.)

Witnesses:

Inventor:
John W. Dunn
By Dyrenforth & Dyrenforth,
Att'ys

UNITED STATES PATENT OFFICE.

JOHN W. DUNN, OF AKRON, OHIO, ASSIGNOR TO THE B. F. GOODRICH COMPANY, OF SAME PLACE.

PNEUMATIC TIRE.

SPECIFICATION forming part of Letters Patent No. 609,962, dated August 30, 1898.

Application filed February 28, 1898. Serial No. 671,944. (No model.)

*To all whom it may concern:*

Be it known that I, JOHN W. DUNN, a citizen of the United States, residing at Akron, in the county of Summit and State of Ohio, have invented a new and useful Improvement in Pneumatic Tires, of which the following is a specification.

My invention relates to an improvement in the class of pneumatic tires in which the tread portion to adapt it the better to resist puncturing is reinforced by an interposed thickness of puncture-proof material.

The primary object of my invention is to secure the advantage of the interposed puncture-proof material and at the same time avoid the tendency thereof to impair or lessen the desirable resilient quality of the tire. This I accomplish by providing a groove of any suitable shape about the external circumference of the tire in the tread portion thereof and extending below—that is, inward beyond—the outer surface of the tire, thereby affording a species of circumferential hinge-joint about the tread portion, which is reinforced with the puncture-proof material at opposite sides of the groove.

Figure 1:
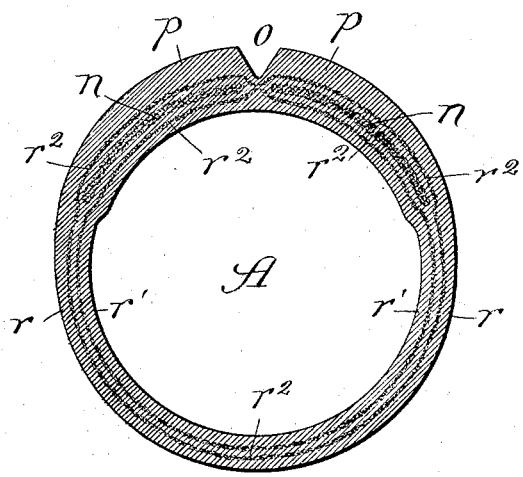
Figure 2:
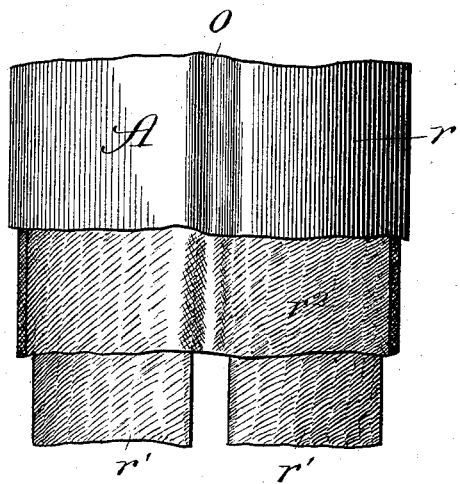

Referring to the accompanying drawings, Figure 1 is a cross-section of a pneumatic tire involving my improvement, and Fig. 2 a plan view of a broken section of the same.

A is a rubber tire of any usual or suitable general construction. As shown, the tire is formed with outer and inner layers $r$ and $r'$ of rubber and interposed fabric (canvas) $r^2$, with adequate thickening of the rubber along the tread portion $p$, the whole being vulcanized together.

In the tread portion $p$ I provide a central circumferential groove $o$, preferably of the V shape illustrated, though it may be of any other suitable shape, and between the layers of fabric $r^2$ (shown as two in number) is interposed at the tread portion a thickness of puncture-resisting material $n$, as canvas, which, however, is not extended across the center of the tread portion, and thus not across the groove $o$, but is omitted for, say, about one-sixteenth of an inch directly along the apex of the V-shaped groove. Thus the tire contains about the center of its tread a species of hinge-joint which allows the tire to contract and expand while being ridden without offering such resistance from the puncture-resisting material $n$ as to impair the resilient quality of the tire.

What I claim as new, and desire to secure by Letters Patent, is—

1. A pneumatic tire thinned about its tread to form a species of circumferential hinge-joint, and reinforced with puncture-resisting material interposed about the tread portion at opposite sides of such joint, substantially as described.

2. In a pneumatic tire, the tread portion provided with a circumferential groove and reinforced with puncture-resisting material omitted along the base of said groove and extending at opposite sides thereof, substantially as described.

3. In a pneumatic tire, the tread portion provided centrally with a circumferential V-shaped groove and reinforced with puncture-resisting material omitted along the apex of said groove and extending at opposite sides thereof, substantially as described.

JOHN W. DUNN.

In presence of—
    F. P. SHELLHORN,
    B. F. STAUFFER.